US011558075B2

(12) United States Patent
Edgson

(10) Patent No.: US 11,558,075 B2
(45) Date of Patent: Jan. 17, 2023

(54) HANGER BAND AND METHOD FOR SUPPORTING AN ELECTRONIC DEVICE IN AN UPRIGHT POSITION

(71) Applicant: Mark Edgson, Prince George (CA)

(72) Inventor: Mark Edgson, Prince George (CA)

( * ) Notice: Subject to any disclaimer, the term of this patent is extended or adjusted under 35 U.S.C. 154(b) by 57 days.

(21) Appl. No.: 17/101,454

(22) Filed: Nov. 23, 2020

(65) Prior Publication Data

US 2021/0159932 A1 May 27, 2021

Related U.S. Application Data

(63) Continuation-in-part of application No. 29/739,316, filed on Jun. 24, 2020, and a continuation-in-part of application No. 29/721,779, filed on Jan. 23, 2020.

(60) Provisional application No. 63/053,923, filed on Jul. 20, 2020, provisional application No. 62/991,152, filed on Mar. 18, 2020, provisional application No. 62/947,791, filed on Dec. 13, 2019, provisional application No. 62/940,323, filed on Nov. 26, 2019.

(51) Int. Cl.
*H04B 1/3877* (2015.01)
*B64D 11/00* (2006.01)
*A47C 7/72* (2006.01)

(52) U.S. Cl.
CPC .......... *H04B 1/3877* (2013.01); *A47C 7/723* (2018.08); *B64D 11/00152* (2014.12)

(58) Field of Classification Search
CPC combination set(s) only.
See application file for complete search history.

(56) References Cited

U.S. PATENT DOCUMENTS

| 4,940,204 A | * | 7/1990 | Nelson | F16M 11/10 248/688 |
| 6,402,111 B1 | * | 6/2002 | Stewart | A47B 21/0314 248/316.1 |
| 8,328,055 B1 | * | 12/2012 | Snyder | A45F 5/00 224/267 |
| 9,400,082 B2 | * | 7/2016 | Webster | F16M 11/06 |
| 9,407,743 B1 | * | 8/2016 | Hirshberg | H04B 1/385 |
| 10,244,862 B2 | * | 4/2019 | Gallup | A45C 13/30 |
| 10,836,449 B2 | * | 11/2020 | Lin | B62K 19/40 |
| 11,231,640 B2 | * | 1/2022 | Elias | F16M 13/00 |
| 2010/0258602 A1 | * | 10/2010 | Amin | A45C 13/30 206/701 |
| 2013/0200118 A1 | * | 8/2013 | Johnson | A45F 5/00 224/246 |
| 2014/0151418 A1 | * | 6/2014 | Yang | B60R 11/02 224/275 |
| 2014/0366357 A1 | * | 12/2014 | Haarburger | F16M 13/022 248/214 |
| 2015/0123433 A1 | * | 5/2015 | Lamb, Jr. | B64D 11/00152 297/188.05 |
| 2016/0007735 A1 | * | 1/2016 | Gallup | A45F 5/02 312/352 |
| 2016/0381259 A1 | * | 12/2016 | Johnson | G03B 17/561 348/158 |

* cited by examiner

*Primary Examiner* — Monica E Millner
(74) *Attorney, Agent, or Firm* — John R. Benefiel

(57) ABSTRACT

A hanger band is connected at one end to an electronic device having a display screen and an opposite end connected to a preexisting fixed support so that the electronic device is hung by said hanger band and assumes an upright orientation in being hung by the hanger band.

7 Claims, 12 Drawing Sheets

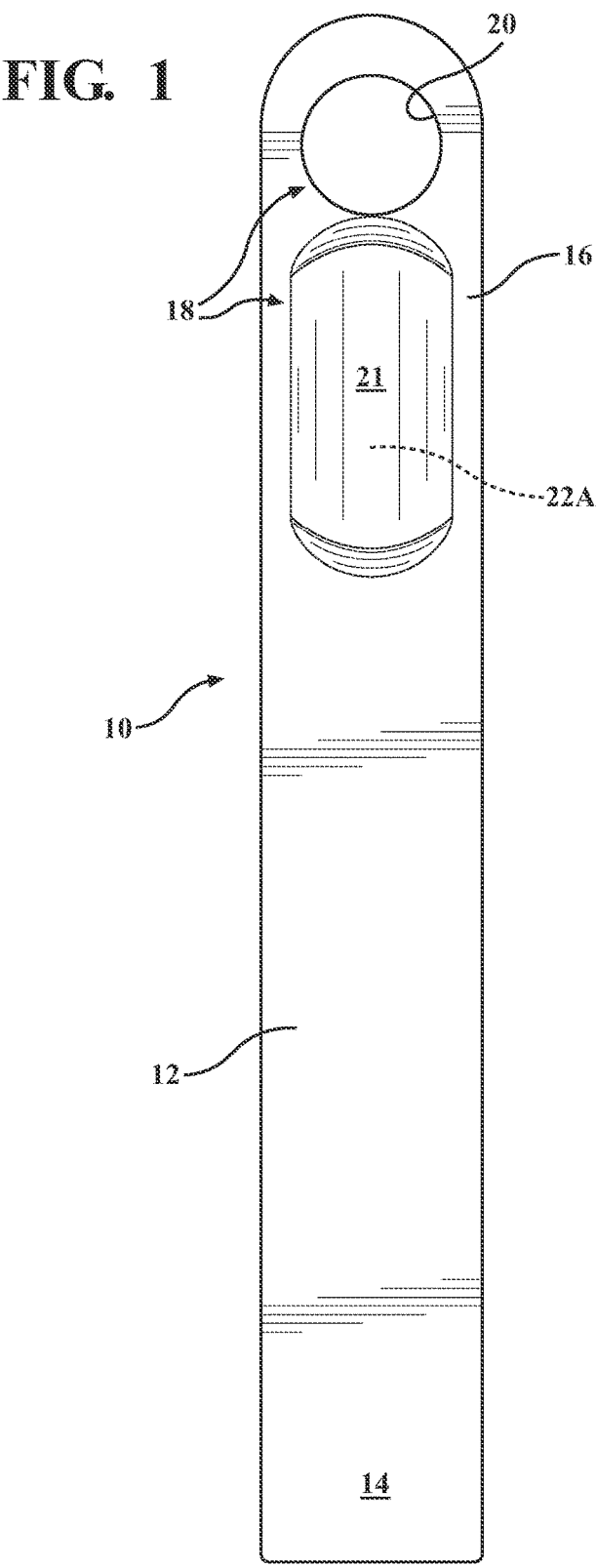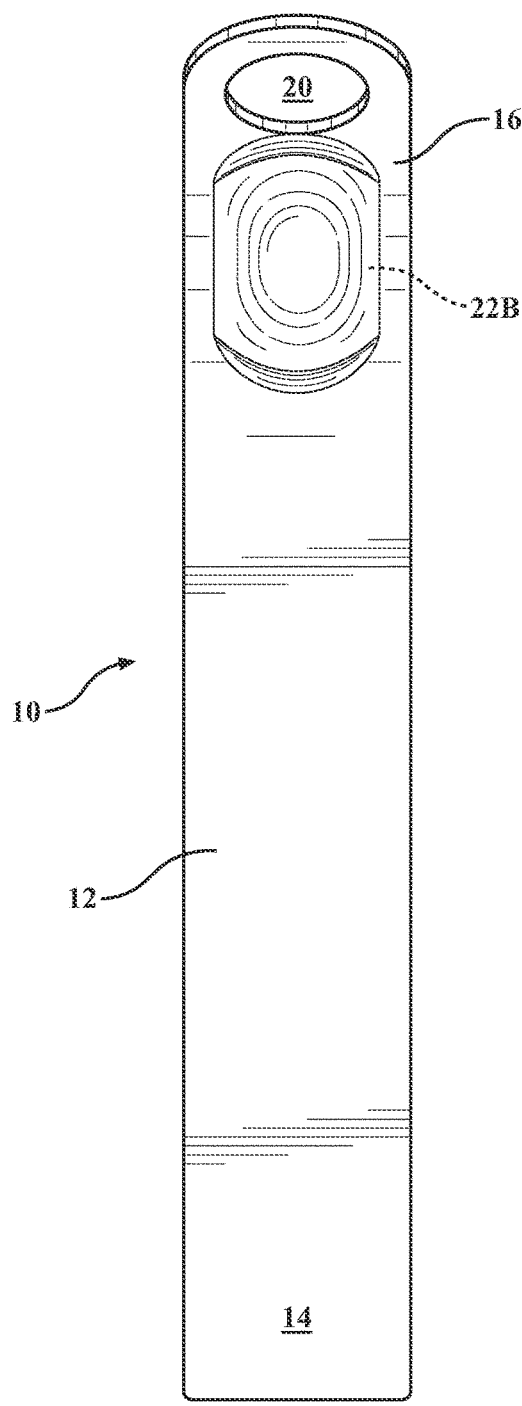

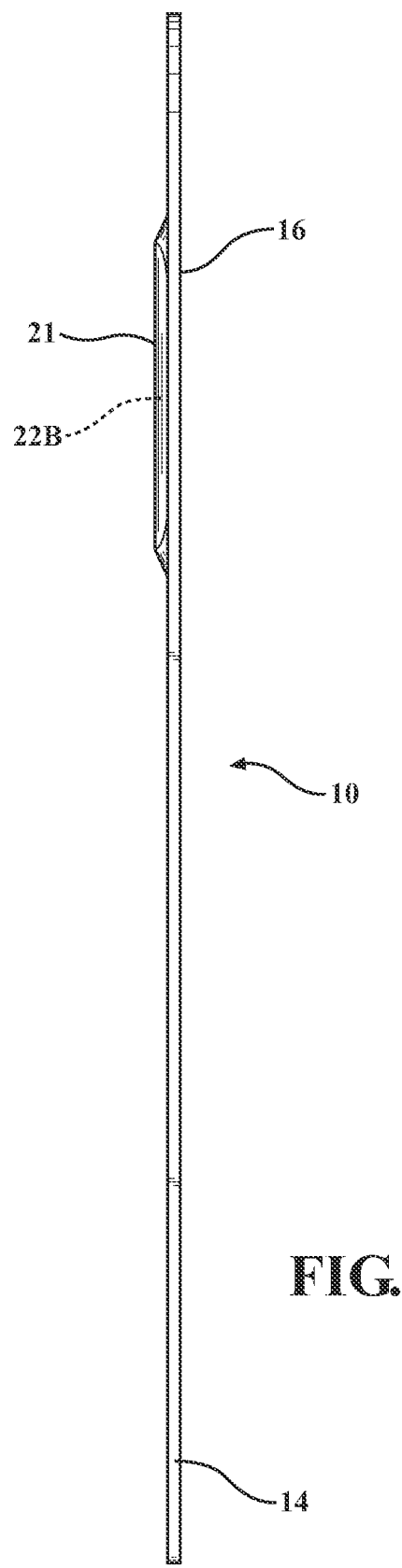
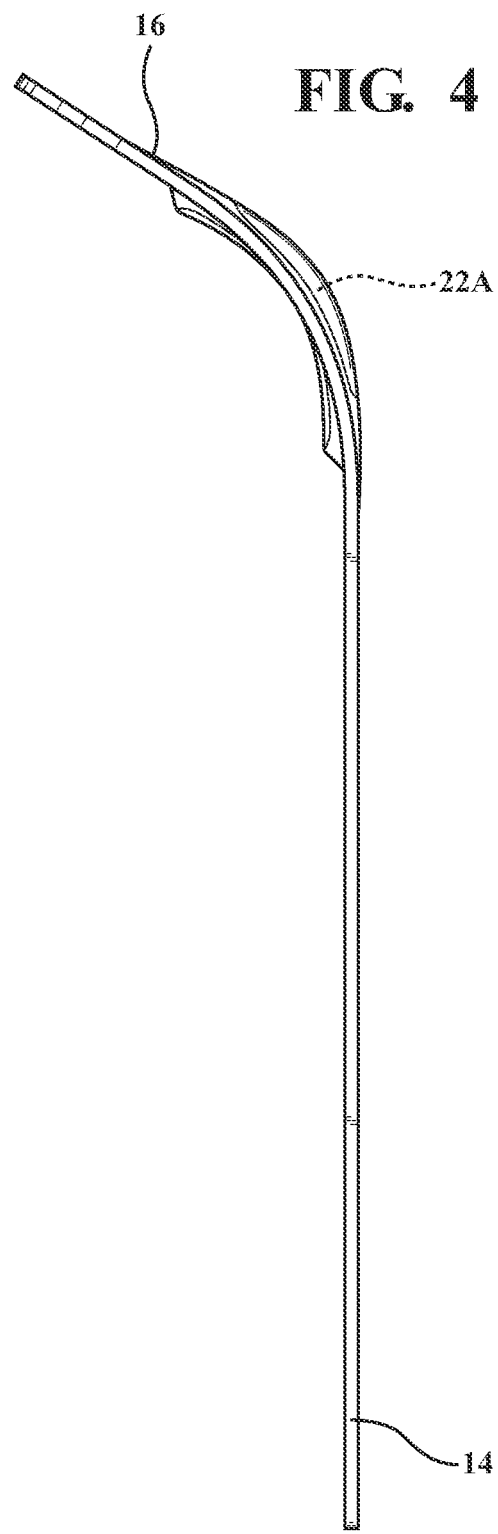

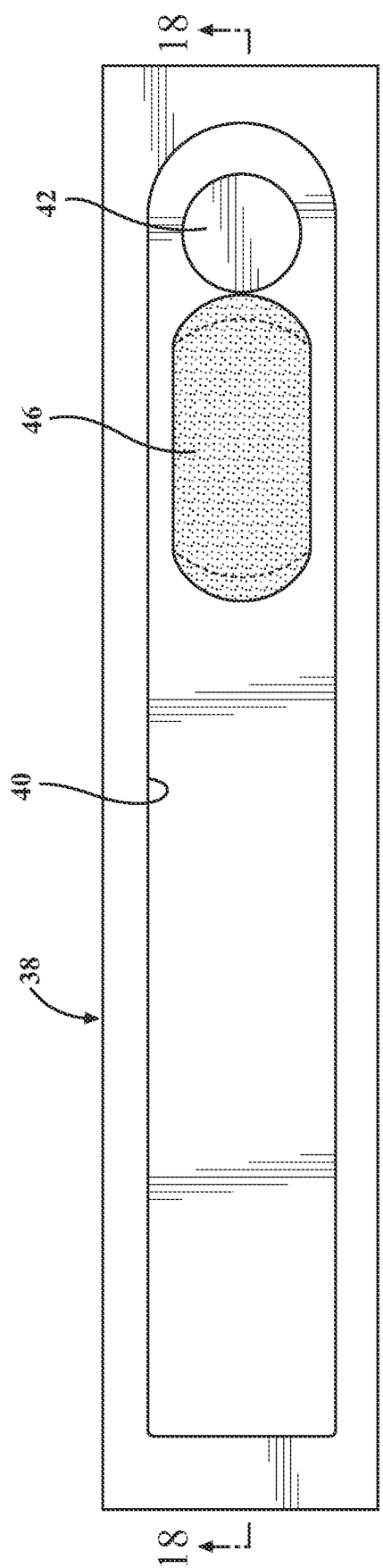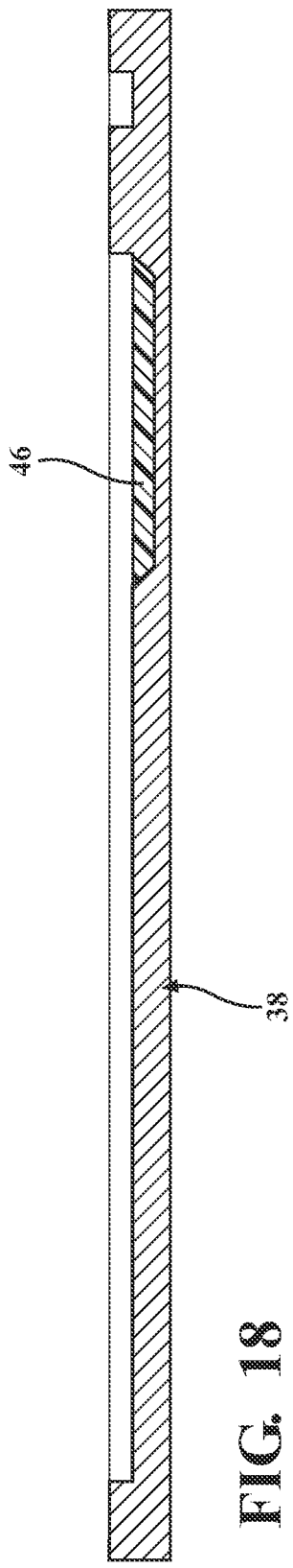
FIG. 17
FIG. 18

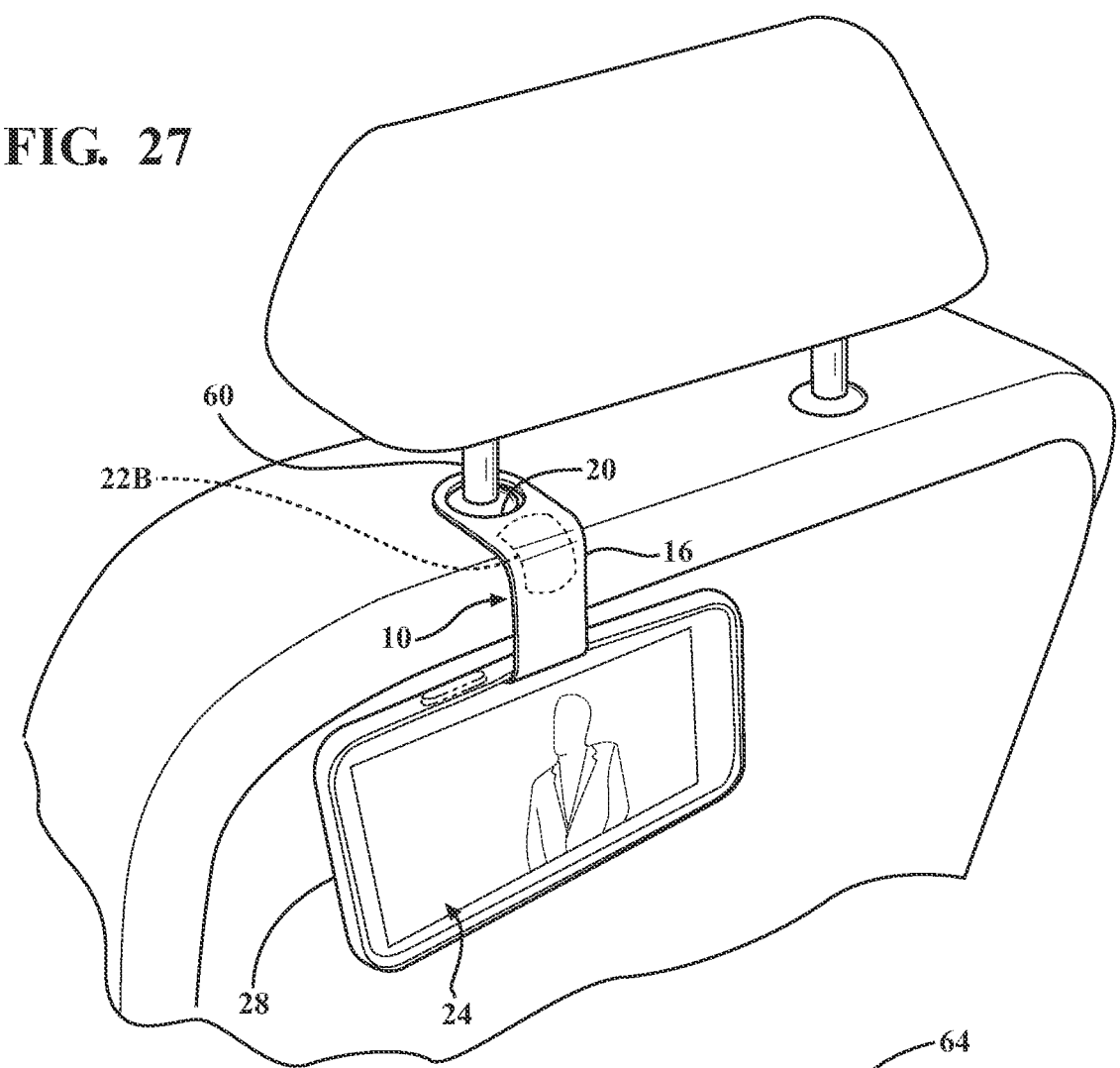
FIG. 27
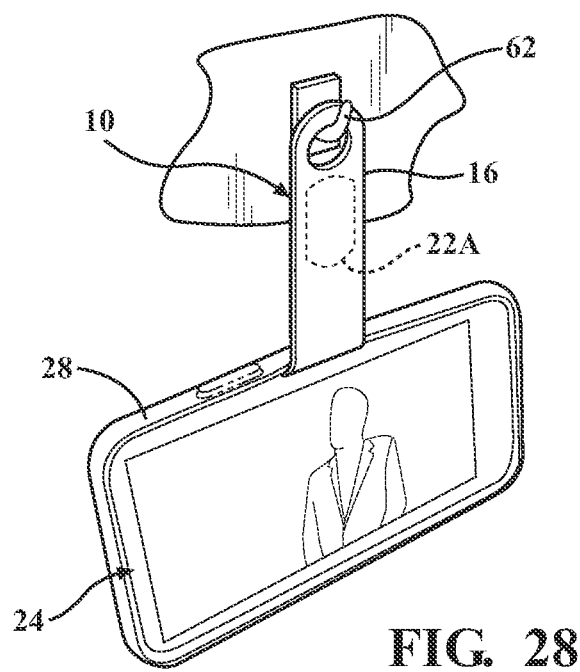
FIG. 28
FIG. 29

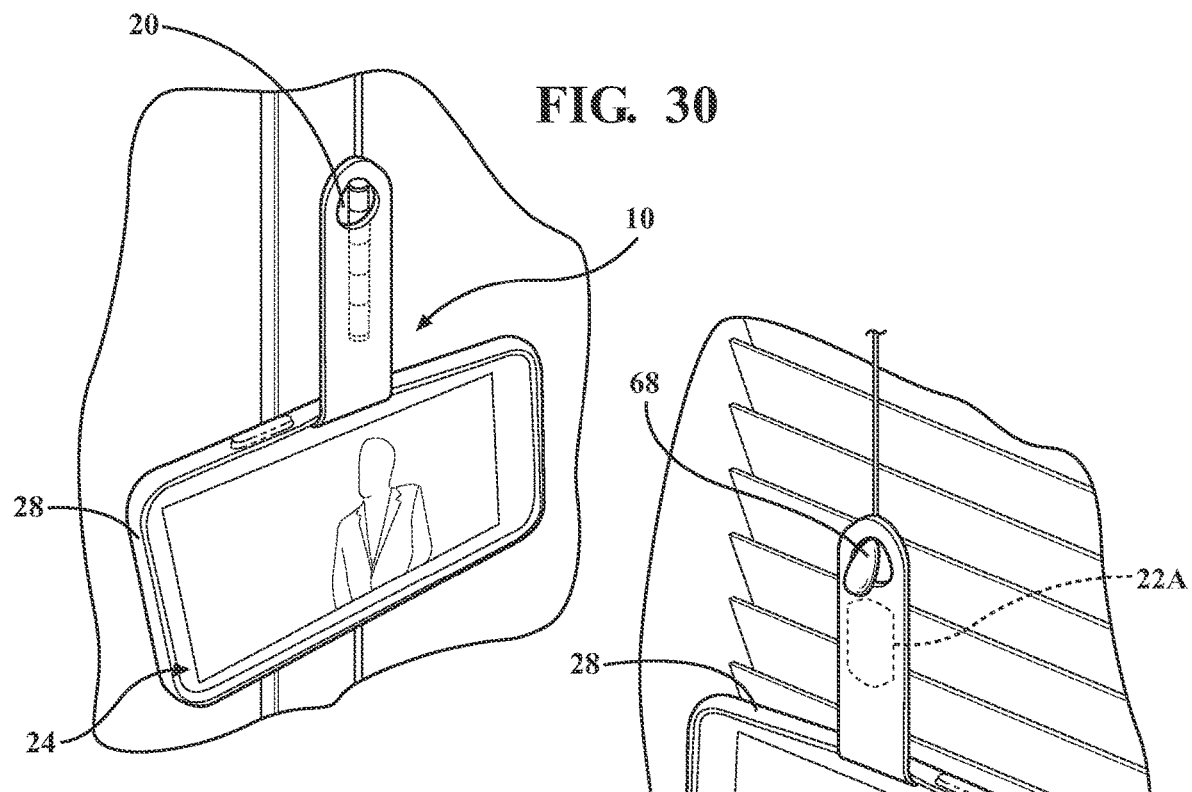
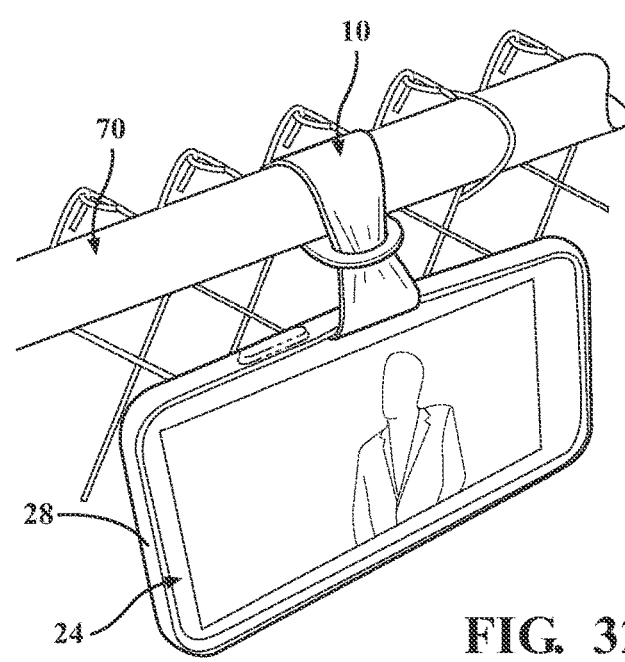
FIG. 30
FIG. 31
FIG. 32

HANGER BAND AND METHOD FOR SUPPORTING AN ELECTRONIC DEVICE IN AN UPRIGHT POSITION

CROSS REFERENCE TO RELATED PATENT APPLICATIONS

This application claims the benefit of U.S. provisional patent application No. 62/940,323 filed on Nov. 26, 2019, and also claims the benefit of U.S. provisional patent application No. 62/947,791 filed on Dec. 13, 2019; and also claims the benefit of U.S. provisional patent application No. 62/991,152 filed on Mar. 18, 2020; and also claims the benefit of U.S. provisional patent application No. 63/053,923 filed on Jul. 20, 2020; and is a continuation-in-part of U.S. design application no. 29/721,779 filed on Jan. 23, 2020 and a continuation-in-part of U.S. design application no. 29/739,316 filed on Jun. 24, 2020.

BACKGROUND OF THE INVENTION

This invention comprises an accessory for electronic devices such as cell phones and tablets having a display screen which enables a user usually sitting in front of the device to watch movies, TV, etc. Such devices are not shaped so as to be able to be simply placed on a flat surface in an upright orientation and allow proper viewing of the display screen. This is unlike laptop computers which can vertically orient the display screen since hinged to the keyboard to be swung up to be in an upright position when the lap top keyboard is resting on a flat surface. The display screen of cell phones and tablets themselves are not able to be positioned upright except by manually holding the device with one hand of a person because of their flat shape. The display can also be properly viewed by putting the device in a dock which can be set on a flat surface large enough so that the dock can be rested thereon. This is a greater problem with larger tablets.

If such flat surface is not available, a person must still hold the device upright to properly view the display. However, in either case, a person soon finds that having to hold such a device for lengthy periods such as when watching a movie on a long flight gets quite tiresome.

Even if a large surface is available, most such docks are bulky and must be packed in one's carry-on luggage in order to have it on the plane.

Furthermore, unless only completely smooth air is experienced during an entire flight, sudden movements by the plane can easily topple the dock and the associated electronic device to fall to the floor and perhaps be damaged since only gravity and slight friction holds these items in position, as no attachment to the flat surface is possible. Even when a flight is smooth, the dock and cell phone are in the way on a tray and apt to get inadvertently knocked over by the passenger. In many other situations there is an absence of a suitably large surface to allow use of a dock.

Similarly, when taking photos or making videos or other works which most cell phones and tablets have the capability to do, to record a "selfie", the electronic device must be held upright and in a proper position, which also requires the electronic device to be held manually typically with the aid of a "selfie" stick. This limits the content of the photos or videos.

The hanger band described herein greatly enhances the ability to compose various photos, videos or other works since a hand holding of the electronic device such as cell phones or tablets is not required to position the same upright.

It is an object of the present invention to provide for securely supporting such an electronic device in an upright position while viewing the display which does not require any manual effort on the part of the user while viewing the display, does not require a relatively large flat surface to support the device nor need any bulky supports and is not in the way nor easily dislodged and dropped.

There are many other situations where it would be convenient to not have to hold such a device while viewing the screen, such as when in an airport waiting for a delayed flight or business meeting, etc., or using the device to take photos or videos with the electronic device.

Accordingly, it is another object of the present invention to provide a hanger band and method for supporting an electronic device of the type described in an upright orientation to eliminate the necessity of manually holding the device in order to be able to properly view a display screen, or to position an electronic device when creating photos or videos or other works.

It is still another object to provide a compact easily stowed hanger band for such an electronic device which does not require a bulky dock to be positioned upright and dislodging of the electronic device when in an upright position.

SUMMARY OF THE INVENTION

The present invention utilizes a flexible plastic strip forming a hanger band which is able to have one end attached to a cell phone or tablet or other similar electronic device having a display screen. An opposite end of the hanger band preferably has a plurality of attachment adjacent features thereon. Each of these features can be connected to commonly encountered preexisting supports such that a suitable support will most likely be available in most situations.

The support according to the present invention enables an electronic device to be supported in an upright orientation by being hung from a preexisting support which causes the electronic device to assume an upright orientation and does not need a dock holder or a large flat surface to be securely held so as to not be subject to falling to the floor and possibly be damaged.

Thus, viewing a display can be done without requiring a person to manually hold such an electronic device, as well as to be conveniently positioned to take photos, videos and create other works.

One of such attachment features comprises a large hole adjacent to an opposite end of the hanger band from the end attached to the electronic device, able to be conveniently used to create an attachment to various preexisting supports as by being received a protrusion in the hole of a preexisting support, by wrapping the hanger band around a horizontal member, or by an attachment to a magnet held in the hole so as to be able to be attached to a metal surface.

Another attachment feature formed on the other end of the hanger band is comprised of a bistable metal piece mounted adjacent the hole and having two stable conditions, each attachable to a support with differing configurations preexisting supports as described in detail herein after.

Such a hanger band is very compact and convenient to pack or to even be simply put in a person's pocket or hand bag.

The hanger band is able to be attached to an electronic device of a type described either having or able to be equipped with a conventional protective rectangular case having a flat back wall and an upright rim extending around the perimeter of the case back wall. The cases are made of a stretchable material. This allows the electronic device to be inserted into the case and held therein in by the rim which is complementarily curved to receive curved side edges of the electronic device itself to be securely held after the device is installed in the case. To be attached, one end of the hanger band is inserted between the back side of the electronic device opposite the side having the display screen thereon and the back wall of the case when the electronic device is not fully seated in the case. Thus, when the electronic device is fully seated in the case, the hanger band one end is frictionally connected to the backside of the electronic device.

DESCRIPTION OF THE DRAWING FIGURES

FIG. 1 is an enlarged front view of a hanger band according to the present invention with a bistable metal insert piece molded within the hanger band in a straight condition.

FIG. 2 is an enlarged front view of the hanger band shown in FIG. 1 with the bistable insert piece in a curved condition and molded within a protruding portion of the hanger band.

FIG. 3 is a side view of the hanger band according to the invention with the bistable insert in the straight condition as shown in FIG. 1.

FIG. 4 is a side view of the hanger band according to the invention with the bistable insert piece in the curved condition shown in FIG. 2.

FIG. 17 is a plan view of the mold shown in FIG. 16 with a quantity of partially cured plastic filling a pocket in the mold.

FIG. 18 is a sectional view of the mold with a quantity of partially cured plastic in the pocket in the mold.

FIG. 27 is a perspective partial view of a seat with a headrest connected to a hanger band according to the invention holding at one end an electronic device and connected at the other end by the attachment hole by receiving one of the head rest support rods.

FIG. 28 is a perspective view of an electronic device of the type described connected to one end of a hanger band according to the invention with the attachment hole at the other end received onto a hook to be hung thereby in an upright orientation.

FIG. 29 is a perspective fragmentary view of a cell phone attached to one end of the hanger band and the other end having a magnet held in the hole therein, the magnet held against a surface.

FIG. 30 is a perspective view of an electronic device of the type described hooked onto a door hinge pin with the attachment hole on the hanger band to be hung in an upright orientation.

FIG. 31 is a perspective view of an electronic device of the type described supported by a hanger band hooked on a Venetian blind pull.

FIG. 32 is a perspective view of an electronic device of the type described supported by a hanger band passing through an attachment hole on the hanger band in order to be able to be wrapped around a horizontal fence top support member in a fashion similar to that shown in FIG. 26.

DETAILED DESCRIPTION

Figure 6:
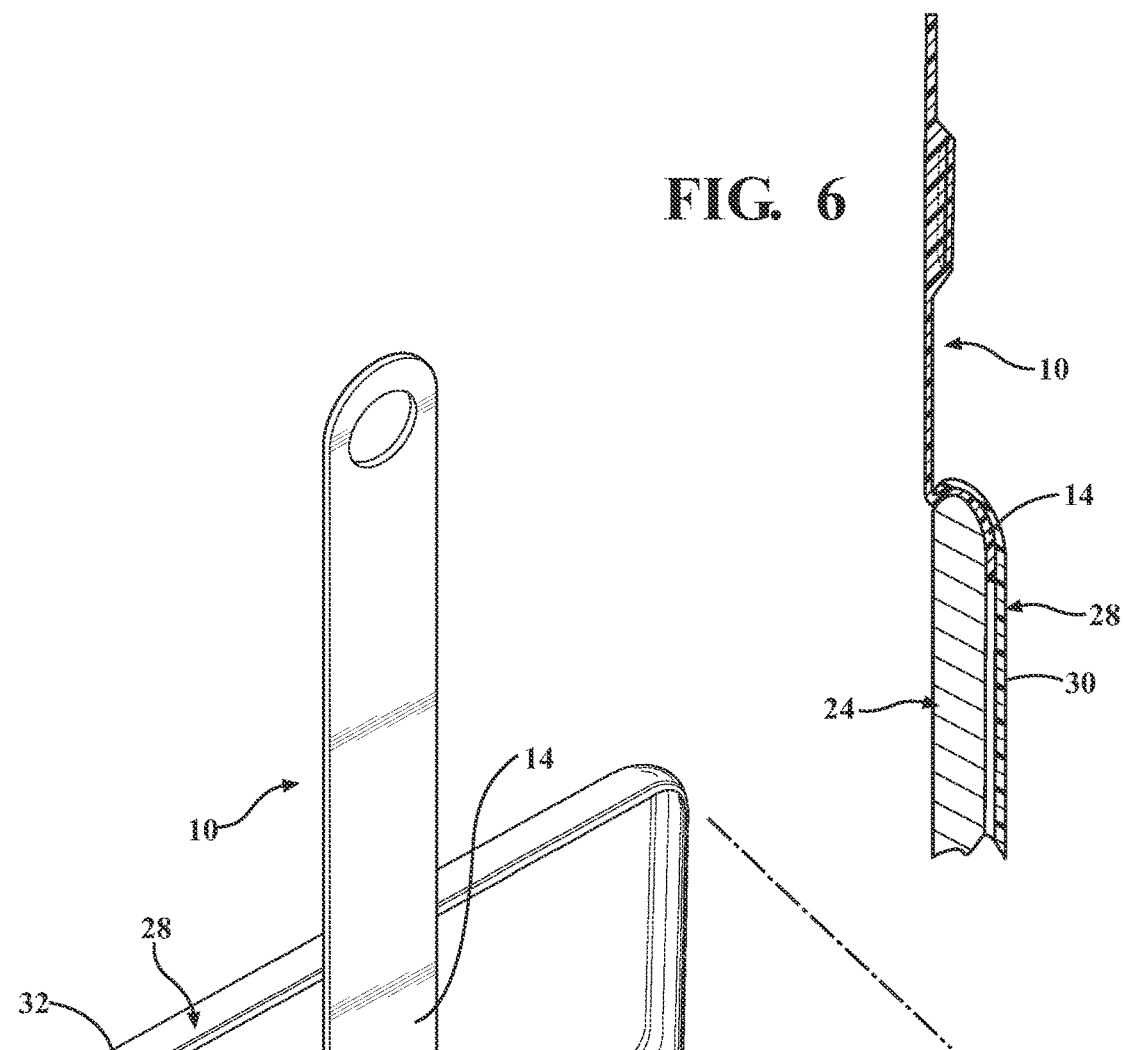
FIG. 6 is a sectional view of the items shown in FIG. 5 assembled together to frictionally connect the one end of the hanger band according to the present invention to the case and the electronic device.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

A hanger band 10 is shown in FIG. 1 which hanger band 10 includes a flexible strip 12 which is about 1 inch wide, 7 inches long and 0.056 inches thick preferably made from PVC #3 plastic with one end 14 adapted to be detachably mounted to a cell phone, tablet or other similar electronic device as described below.

The other end 16 of the band 10 has a plurality of attachment features 18 each of which are configured to be engaged with various preexisting supports to be able to suspend an electronic device of the type described upright in either a vertical or horizontal orientation thereof as described below.

One such attachment feature comprises a large centered hole 20 preferably about 5/8" in diameter hole 20 formed in the opposite end 16 of the hanger band 10 which can be used to mount the hanger band 10 to a suitable preexisting relatively fixed support so as to suspend an electronic device in an upright orientation as described below.

A second attachment feature is also located adjacent the opposite end 10 which comprises a bistable metal piece 22 preferably of stainless steel and 0.017 inches thick, molded into the a thickened area of the plastic used to form the hanger band 12 at a location adjacent to the hole 20 in the opposite end 16 of the hanger band 10. As described below in detail, the bistable metal piece 22 has two states, a straight condition 22A shown in FIG. 2, and a curved condition 220B at the opposite end 16 of the hanger band 10. The curved condition 22B facilitates wrapping the hanger band 10 around a horizontal supporting structure as in, and in another straight condition 22B shown in FIGS. 1 and 3 maintains the hanger band 10 substantially straight. Each condition 22A, 22B is useful for attachment to diverse preexisting relatively fixed supports as will be described below.

The state of the bistable piece 22 can be quickly changed by pressing on the plastic protuberance 21 over the center of the piece 22 in the straight condition 22A which will cause it to assume the curved condition. To restore the straight condition the band 12 is bent at the middle of the protuberance 21 causing the piece 22B to snap back to the straight condition 22A.

Such bistable metal pieces are known and commercially available. One supplier is Shenzhen Henghuis Metal Products Ltd, 79 Shanxia Road, Pinghu Town, Shenzhen, China 518000.

Figure 5:
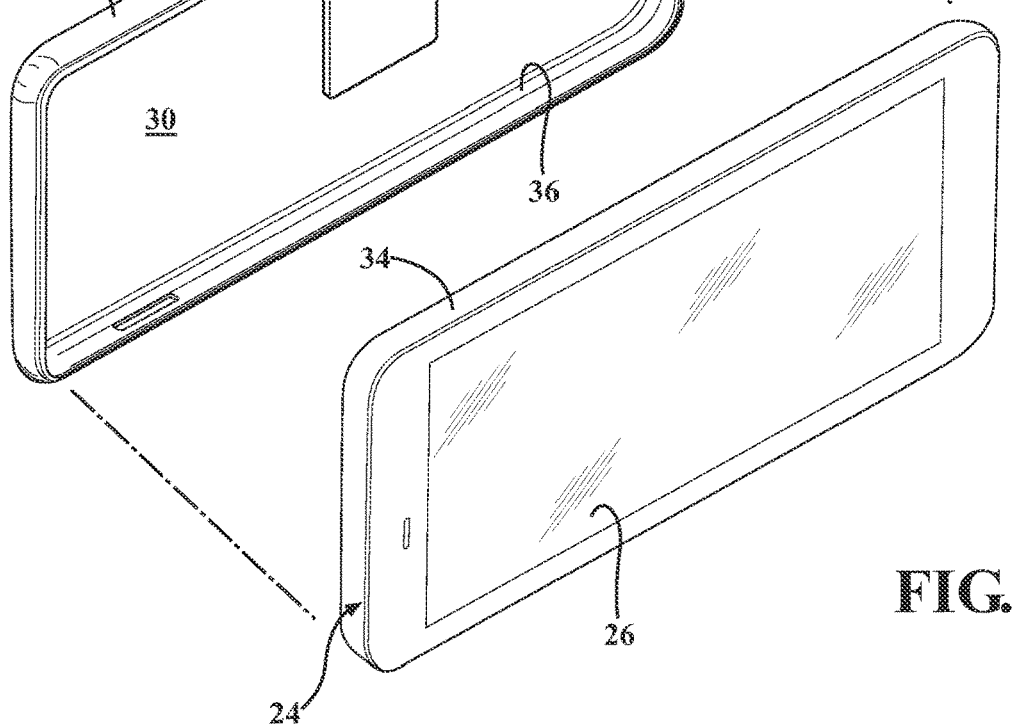
FIG. 5 is an exploded perspective view of an electronic device, a protective case therefore, and a hanger band according to the present invention having one end positioned between a back wall of the case and a back side of the electronic device of the type described when the case is installed on the device in turn to connect the one end of the band to the cell phone.

FIG. 5 shows an electronic device 24 having a display screen 26 on a front side of the device. Such devices are usually equipped with a protective case 28 sized to receive the back side of the device 24 (shown separated in FIG. 5).

The case 28 has a back wall 30 and a perimeter rim 32.

The rim 32 is curved with a curvature matched to a curvature of the perimeter 34 of the electronic device 24 (FIG. 6) in the well known manner. The one end 14 of the band 10 is advanced between the open side of the case 28 and the back of the device 24. The device 24 is then reinstalled in the case 28 with the one end of the band 14 squeezed between the case 28 and the rear side of the device 24.

It should be understood that the hanger band 10 can be inserted either behind the long side of the device 10 as shown in FIG. 5 and the other Figures or behind the short side (not shown) as per the viewer's preference and/or the displayed views.

There is considerable friction developed by engagement of the hanger band 10 against the curved device edge 32 and case surface 33, sufficient to prevent slippage.

FIGS. 7-14 are enlarged depictions of the bistable geometric details.

Figure 7:
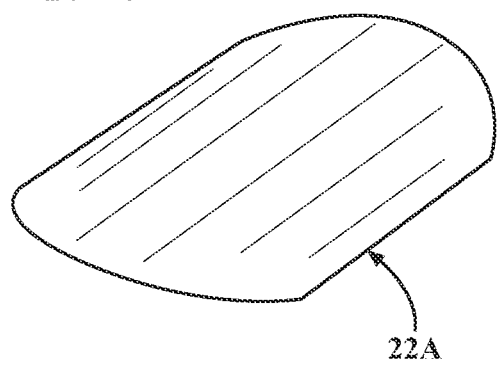
FIG. 7 is an enlarged perspective view of the bistable metal insert piece in the straight condition incorporated into the hanger band.
Figure 8:
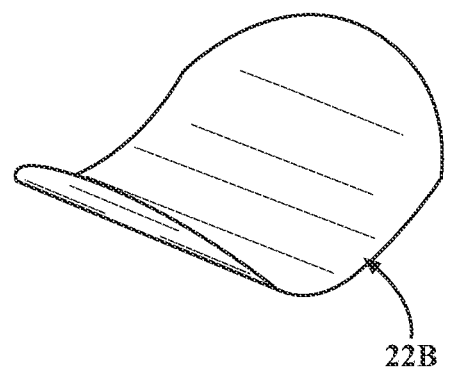
FIG. 8 is an enlarged perspective view of the bistable metal insert piece shown in the curved condition.

FIG. 7 shown the bistable metal piece 22 in the straight condition 22A while FIG. 8 shows the bistable metal piece 22 in the curved condition 22B.

Figure 9:
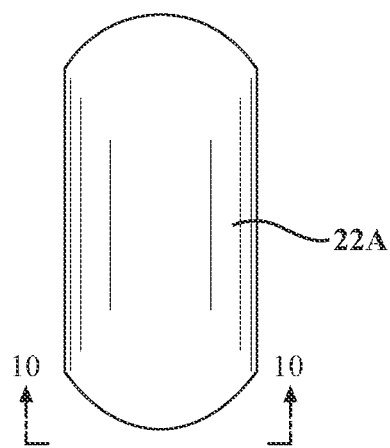
FIG. 9 is an enlarged plan view of the bistable metal insert piece shown in FIG. 7.
Figure 12:
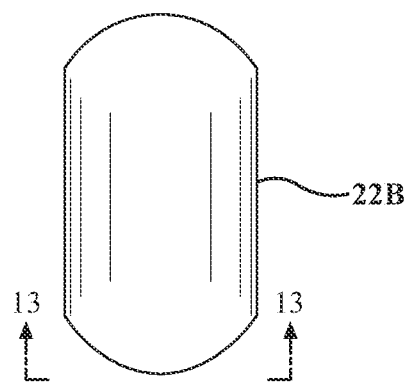
FIG. 12 is an enlarged plan view of the bistable metal insert piece in the curved condition as shown in FIG. 8.

FIG. 9 is a plan view of the bistable metal piece 22 in the straight condition 22A in which it is substantially longer than when in the curved condition 22A shown in FIG. 12.

Figure 10:
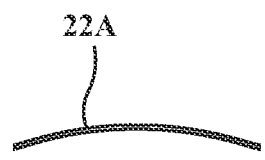
FIG. 10 is an enlarged end view of the metal insert piece shown in FIG. 7 in the direction indicated by the arrows 10-10 in FIG. 9.
Figure 13:
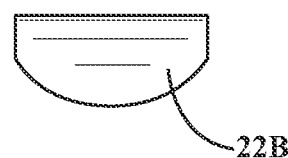
FIG. 13 is an enlarged end view of the bistable metal insert piece in the direction of the arrows 13-13 in FIG. 12.
Figure 14:
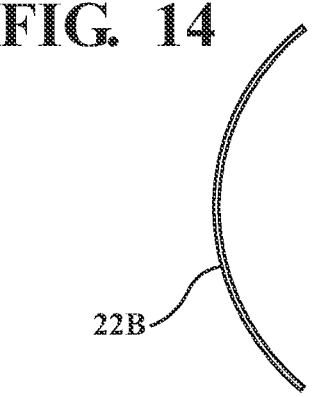
FIG. 14 is a side view of the bistable metal insert piece shown in FIG. 12.
Figure 15:
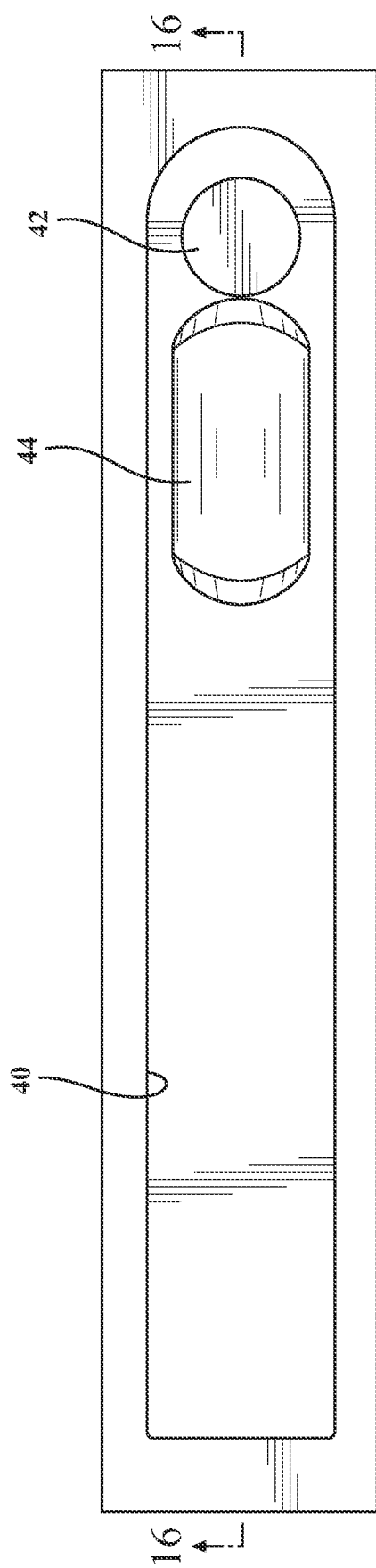
FIG. 15 is a plan view of a mold used to form the hanger band according to the invention.
Figure 16:
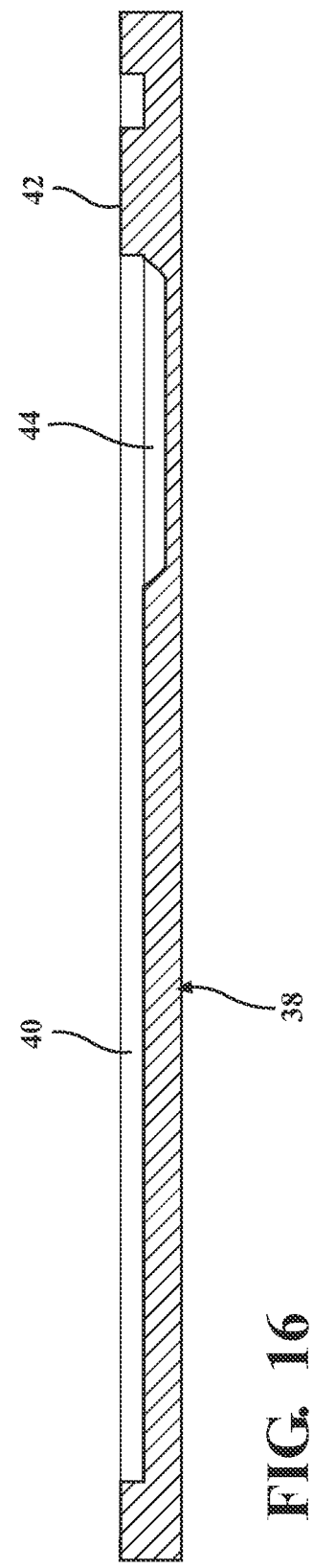
FIG. 16 is a lengthwise sectional view of the mold shown in FIG. 15 taken along the location of arrows 16-16.
Figure 19:
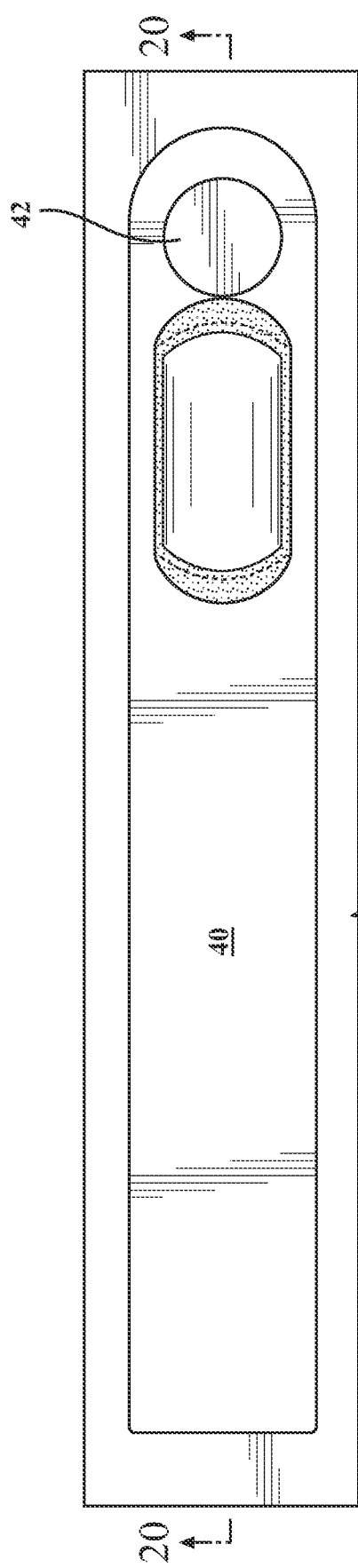
FIG. 19 is a plan view of the mold as shown in FIG. 18 with the bistable metal piece partially inserted into the partially cured plastic in the pocket.
Figure 20:
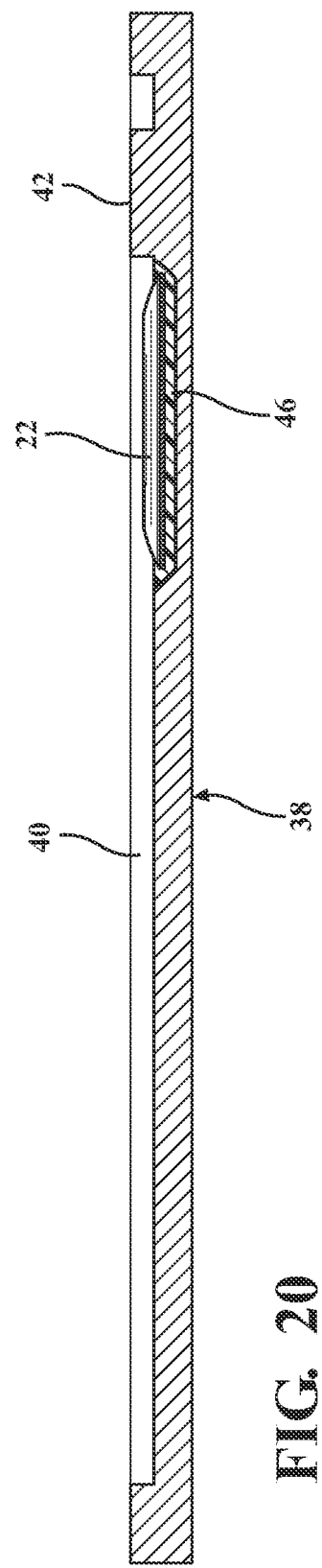
FIG. 20 is a sectional view of the mold shown in FIG. 19 with the bistable metal piece partially inserted into the plastic in the mold pocket.
Figure 21:
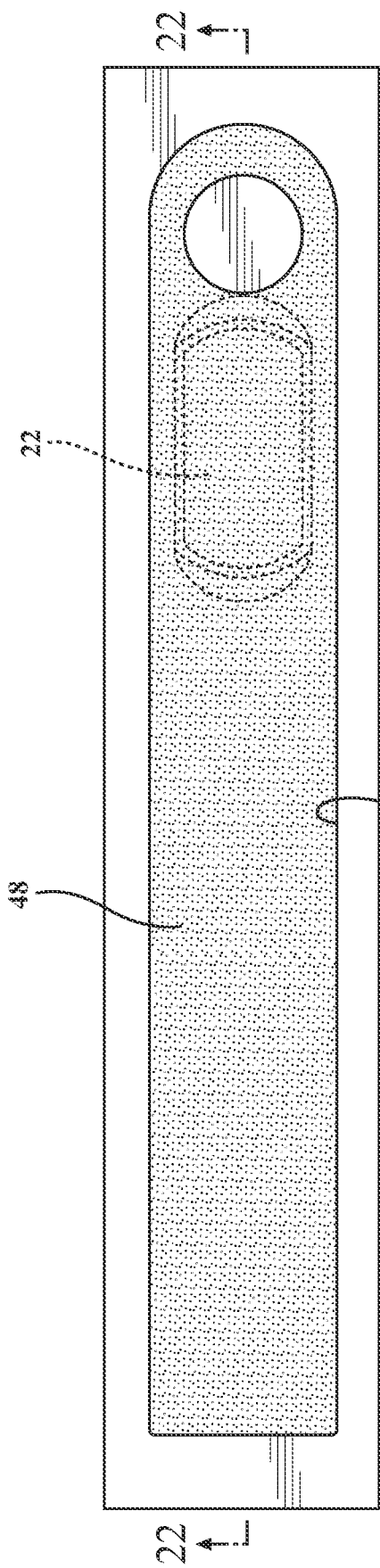
FIG. 21 is a plan view of the mold shown in FIG. 20 with liquid plastic poured into the mold cavity to completely fill the same, with the bistable metal piece enclosed therein shown in broken lines.
Figure 22:
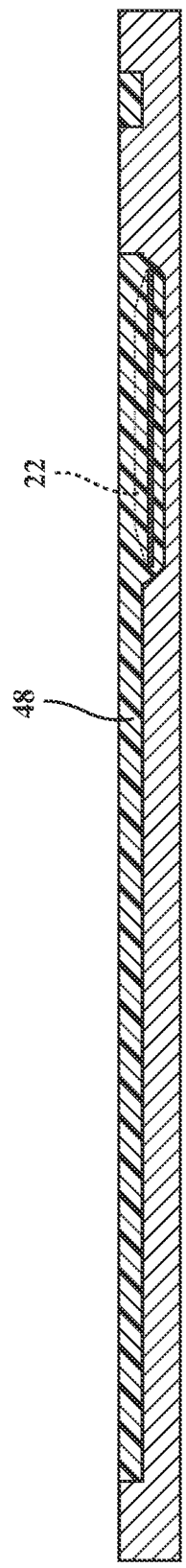
FIG. 22 is a view of the section 22-22 taken in FIG. 21.
Figure 23:
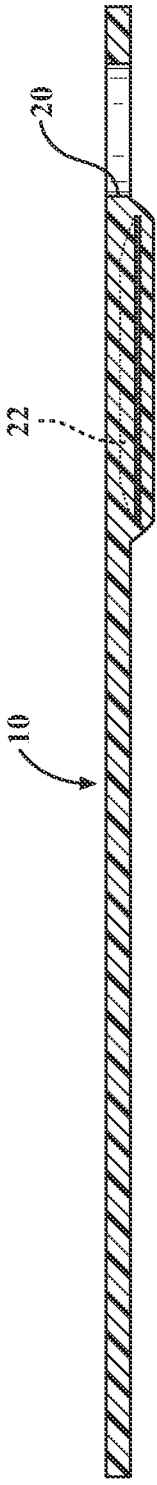
FIG. 23 is a lengthwise sectional view of the completed hanger band.

FIG. 10 shows that in the straight condition 22A, the piece 22 is nearly flat (only about 1/16 inch space in the middle) while in the curved condition 22B it is much higher (FIG. 13, 14). When in the straight condition 22A, pressing the center down causes it to snap into the curved condition 22B shown in FIG. 14.

Figure 11:
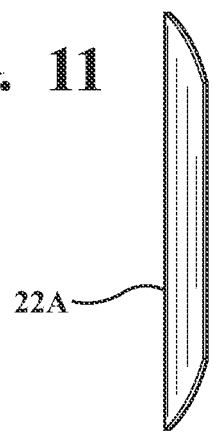
FIG. 11 is an enlarged side view of the bistable metal insert piece shown in FIG. 9.

It should be noted that FIGS. 10 and 11 appear much higher because of the enlarged scale used to clearly illustrate the geometry of the piece 22.

Such bistable metal are well known as mentioned above and used to make novelty items such as the "Slap Bracelet" very popular a few years ago and are commercially available as stated above. A thickness of 0.017 inches of the metal is preferred since under some temperature conditions the curved condition 22B of the bistable piece 22 will sometimes not switch back to the straight condition 22A if the metal is too thin.

For the practice of the present invention, the commercially available bistable sheet metal sold in spools is cut into 1¼ inches lengths and is commercially available in ¾" widths which is satisfactory for practice of the present invention.

The metal piece insert 10 is preferably powder coated before being molded from PVC #3 plastic to reduce any tendency of the edges of the metal to cut into the PVC plastic.

A powder coating of the metal insert piece 22 is also preferable to add a protective layer around the edges of the thin metal insert but also so they may be colored so as to be less visible for light colored PVC plastic bands and also so the edges are not as sharp. This reduces the chance that the insert piece 22 will cut through the PVC during repetitive use.

The insert pieces 22 according to the present invention are cut off in the length specified, i.e., 1¼ inches, and having curved corners 20 provided to resist cutting into the plastic.

Figure 24:
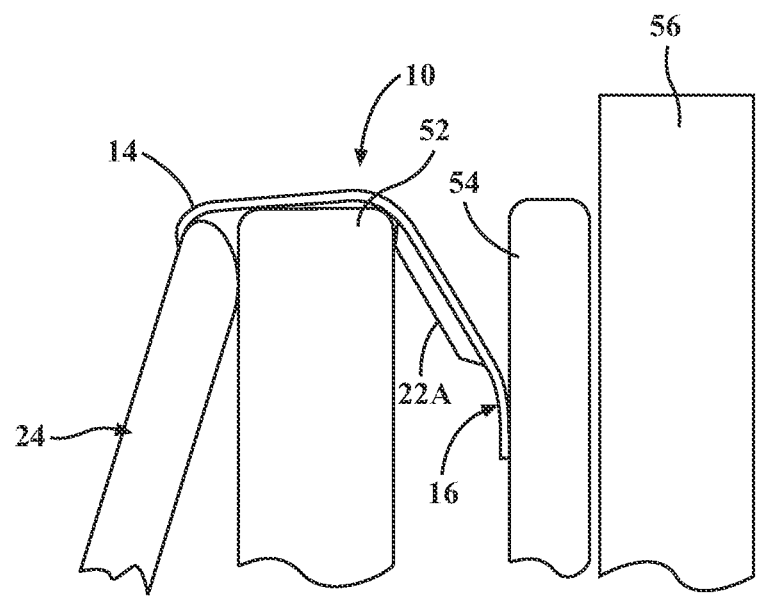
FIG. 24 is a view of a hanger band connected at one end to an electronic device shown in fragmentary form and with the bistable metal piece in the straight condition and the other end of the hanger band engaging spaced apart preexisting supports.
Figure 25:
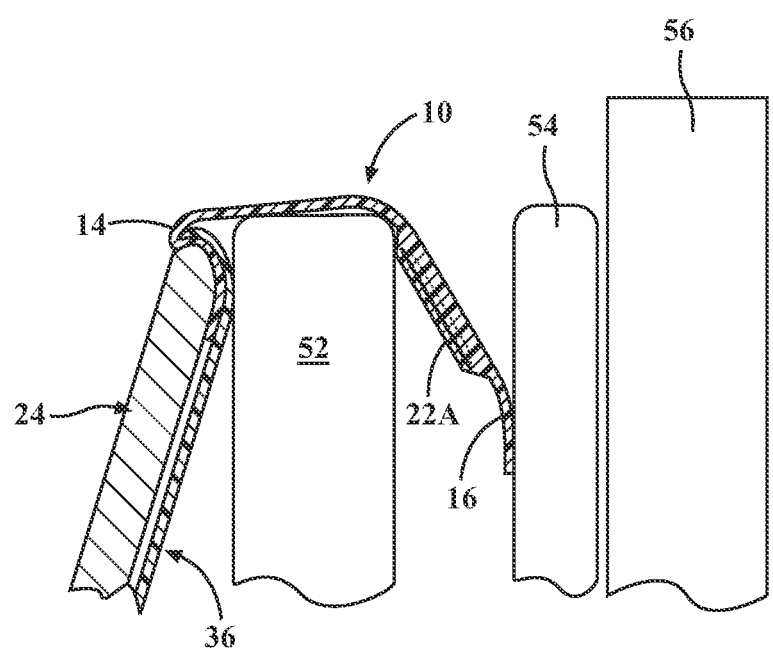
FIG. 25 is a sectional view of the hanger band and an electronic device with spaced apart support structures as shown in FIG. 24.

FIGS. 24 and 25 show a first use of the hanger band 10 according to the invention, in which a preexisting support comprised an airliner seat.

An electronic device 24 is attached to a hanger band 10 by the arrangement shown in FIG. 5.

The hanger band bistable metal piece 22 is in the straight condition 22A so that the hanger band 10 cannot pass around the corner 52 because of the presence of the straight section 22. The lower end of hanger band 10 will be swung over to engage any magazines 54 or the back of the seat 56 itself.

An upward tilting of the device 24 results, which makes for improved viewing from above.

Figure 26:
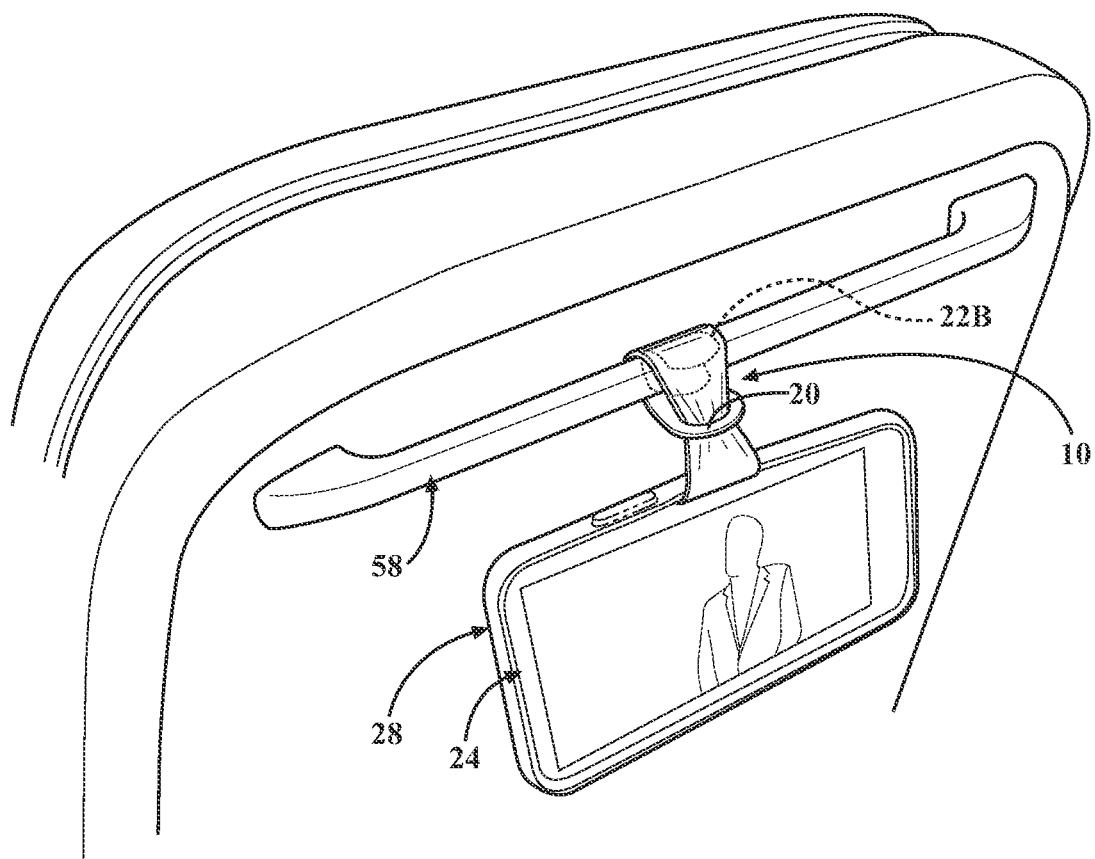
FIG. 26 is a perspective view of a preexisting horizontal support having a hanger band wrapped around the same to suspend an electronic device, with a fragmented view of a seat having the horizontal support attached thereto.

Referring to FIG. 26, the hanger band 10 is wrapped around a preexisting horizontal support 58 the cell phone/tablet 24 is held by a hanger band 10 in the manner described above, but first the lower end 18 of the band 10 is passed through the hole 20 after being wrapped around the member 58 and then the lower end is passed between the electronic device 24 and the case 28.

FIG. 27 shows one of a pair of head rest support rods 60, the hole 20 of the hanger band 10 receiving one rod 60 so that the device 24 is hung therefrom. This advantageously benefits from a curved condition 22B of the bistable metal piece 22 since facilitating the wrapping of the hanger ban 10.

FIG. 28 shows the hole 20 of the hanger band 10 received over a hook 62. This requires the bistable metal 22 insert to be in the straight condition 22A.

FIG. 29 shows a magnet 64 held in the hole 20 of the hanger band 10 to mount on a refrigerator (not shown) or other metal support. The bistable metal piece 22 itself may be magnetized.

The magnet 64 is preferably of two part construction connected together so as to be fixed in the hole 22.

FIG. 30 shows hooking of the hole 20 on a hinge pin 66 of a door. This requires the bistable straight condition 22A (not shown).

FIG. 31 shows a Venetian blind pull 68 received in the hole 20 and again a straight bistable piece 22A is required.

Finally the curved condition of the bistable metal piece 22 of the hanger band 10 is shown in FIG. 27 wrapped around a fence horizontal pipe 70. This arrangement allows photos, videos, and other works to be created freed from the need for the user to hold the electronic device 24 even with a selfie stick (not shown) when the user creates such photos, videos or other works with the electronic device 24 in a stationary position. A timer (not shown) is included in such devices 24 to allow selfies in the well known manner.

These are typical examples as many other arrangements are possible.

Thus the hanger band 10 is very versatile in its application and lightweight yet strong as the electronic devices are held much more securely when hung compared to merely setting the electronic device 24 on a surface with no connection or other securement of a dock to the surface to support the member holding the electronic device 24.

The invention claimed is:

1. A hanger band arrangement for supporting an electronic device which device includes a display screen on a front side of said electronic device on which movies, TV programs or other displays can be viewed which device cannot be set down on a horizontal surface so as to rest in an upright position to enable viewing said display screen;

said hanger band arrangement comprising a single flexible strip having one end attachable to a backside of said electronic device away from said display screen substantially centered along the length of said electronic device so as to not block a user from viewing any portion of said display screen;

said flexible strip having an opposite end having a plurality of diverse attachment features thereon each able to be connected to one of a diverse variety of preexisting supports so as to be able to hang said electronic device from one of said preexisting supports, said electronic device thereby assuming an upright orientation to thereby enable viewing said display without the need to manually hold said electronic device to view said display, said flexible strip and said attached electronic device configured to be able to be hung on a plurality of differing preexisting supports; wherein one attachment feature of said plurality of attachment features comprising a hole formed in said hanger band adjacent to said opposite end of said hanger band; and wherein another of said attachment features comprises a curved bistable metal strip mounted to said hanger band adjacent said opposite end thereof, said bistable metal strip able to be manually caused to assume either of two different stable configurations, a first configuration curved transversely to a length of said metal strip and alternatively caused to assume a curvature transverse to said hanger band, and a second configuration curved in a lengthwise direction having parallel sides shallowly curved along its length, a manual compression of said at a top thereof able to cause a second stable configuration to be assumed having a curved shape normal to the length of said straight configuration metal piece, said straight configuration resisting bending of a section of said hanger band wherein said straight metal piece is present adjacent said opposite end of said hanger band, so that said hanger band is inserted behind a vertical structure to resist being moved out from behind said wall because of the presence of said straight condition of said bistable piece preventing pulling said hanger band around said vertical structure, and when said curved stable condition is established, facilitating said hanger band wrapping around a preexisting support.

2. The hanger band arrangement according to claim 1 wherein one or more of said preexisting supports are able to be passed into said hole in said other end of said hanger band to thereby hang said electronic device from said one or more preexisting supports and assume an upright orientation so as to enable viewing of said display.

3. The hanger band arrangement according to claim 1 wherein said bistable curved metal piece is molded within an enlargement of said flexible strip adjacent said opposite end of said plastic strip to accommodate movement of said bistable curved metal piece caused by a change in condition of said bistable metal piece from said straight condition to said curved condition and vice versa.

4. A method of hanging an electronic device of a type having a display on a front side thereof and having a removable protective casing having a rectangular back wall and a back wall rim extending toward said front side and around a perimeter of said back wall of said electronic device which has a curved outer edge received into a curvature of said rim to be fit thereto, said casing being resiliently stretchable to allow said electronic device to be installed and removed from said case, and wherein a flexible hanger band is attached to said electronic device by lifting at least a part of said casing rim away from said electronic device and inserting said one end of said hanger band past said rim and onto said rear wall and then releasing said rim to create a frictional engagement between said rim and said one end of said hanger band and also said rear wall of said casing to releasably attach said hanger band one end to said electronic device.

5. The hanger band according to claim 4 wherein said hanger band is formed from a flexible plastic material frictionally held in said position between said electronic device back side and said casing rear wall.

6. A method of holding an electronic device having a display on a front side thereof using a hanger band able to be connected at one end centered on a backside of said electronic device, said hanger band having a hole adjacent an opposite end thereof, including the step of passing said one end of said hanger band around a preexisting horizontal support and through said hole and thereafter attaching said one end to a backside of said electronic device.

7. A method of supporting an electronic device in a case haing an opening therein able to receive said electronic device therein in an upstanding position, said electronic device having a display on a front side thereof, and wherein the shape of said electronic device is such that it cannot be self supporting in an upright position when rested on a horizontal surface, includes the step of connecting one end of a single hanger band to a backside of said electronic device at a centered location on said electronic device and connecting an opposite end of said single centered hanger band to a preexisting support so that said electronic device is hung using said single centered hanger band to thereby assume an upright position able to be centered along one side of said electronic device.

\* \* \* \* \*